United States Patent
Raymond et al.

(10) Patent No.: US 11,146,946 B2
(45) Date of Patent: Oct. 12, 2021

(54) PRESENCE SERVER MESSAGE HANDLING

(71) Applicant: T-Mobile USA, Inc., Bellevue, WA (US)

(72) Inventors: Miles Raymond, Kirkland, WA (US); Tarannum Ferdous, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/575,257

(22) Filed: Sep. 18, 2019

(65) Prior Publication Data

US 2020/0100100 A1    Mar. 26, 2020

Related U.S. Application Data

(60) Provisional application No. 62/734,147, filed on Sep. 20, 2018.

(51) Int. Cl.
| | |
|---|---|
| *H04W 8/24* | (2009.01) |
| *H04M 3/42* | (2006.01) |
| *H04W 60/06* | (2009.01) |
| *H04W 4/12* | (2009.01) |
| *H04L 12/58* | (2006.01) |
| *H04L 29/08* | (2006.01) |

(52) U.S. Cl.
CPC ............ *H04W 8/24* (2013.01); *H04L 51/043* (2013.01); *H04L 67/24* (2013.01); *H04L 67/26* (2013.01); *H04M 3/42374* (2013.01); *H04W 4/12* (2013.01); *H04W 60/06* (2013.01)

(58) Field of Classification Search
CPC combination set(s) only.
See application file for complete search history.

(56) References Cited

U.S. PATENT DOCUMENTS

| | | | |
|---|---|---|---|
| 2003/0095524 A1 | 5/2003 | Stephens et al. | |
| 2007/0288621 A1 | 12/2007 | Gundu et al. | |
| 2009/0275314 A1* | 11/2009 | Cotevino | H04L 67/24 455/414.2 |
| 2013/0054740 A1 | 2/2013 | Klein et al. | |
| 2013/0260733 A1 | 10/2013 | Lidin et al. | |
| 2013/0316708 A1* | 11/2013 | MacPherson | H04W 4/021 455/435.1 |
| 2014/0057667 A1 | 2/2014 | Blankenship et al. | |

(Continued)

OTHER PUBLICATIONS

Office Action for U.S. Appl. No. 16/575,321, dated Mar. 12, 2021, Raymond, "Presence Server Message Handling," 14 pages.

(Continued)

*Primary Examiner* — Steven S Kelley
(74) *Attorney, Agent, or Firm* — Lee & Hayes, P.C.

(57) ABSTRACT

A presence server in a network can receive capability information about a UE in a publish message, and make that capability information available to other UEs on the network. When the UE later deregisters from the network, the UE can send an unpublish message. However, the presence server can at least partially disregard the unpublish message and continue to make the capability information about the UE available to other UEs. The presence server can also filter capability information of one or more target UEs provided to a watcher UE based on a registration status of a target UE, capabilities of the watcher UE, and/or whether a set of target UEs associated with a single user share certain capabilities.

13 Claims, 8 Drawing Sheets

(56) References Cited

U.S. PATENT DOCUMENTS

| | | | |
|---|---|---|---|
| 2014/0289343 A1* | 9/2014 | Turakhia | H04L 12/1822 |
| | | | 709/206 |
| 2016/0249209 A1 | 8/2016 | Zhang et al. | |
| 2017/0006110 A1* | 1/2017 | Chiang | H04L 65/1006 |
| 2017/0171120 A1* | 6/2017 | Chiang | H04L 51/043 |
| 2018/0270648 A1* | 9/2018 | Stafford | H04L 65/1006 |
| 2020/0099757 A1* | 3/2020 | Raymond | H04L 51/043 |

OTHER PUBLICATIONS

Office Action for U.S. Appl. No. 16/575,321, dated Jul. 8, 2021, Raymond, "Presence Server Message Handling," 15 pages.

Rosenberg et al., "Indicating User Agent Capabilities in the Session Initiation Protocol (SIP)," Internet Engineering Task Force, 2004, 37 pages.

* cited by examiner

|  | Registration Status Information 402 — Currently Registered? | Capability Information 404A — RCS Open Group Chat (Key Capability 406) | Capability Information 404B — RCS File Transfer | Capability Information 404C — RCS Audio Messaging | ... |
|---|---|---|---|---|---|
| UE 102A (User 104A) | NO | YES | YES | YES | ... |
| UE 102B (User 104B) | YES | YES | NO | YES | ... |
| UE 102C (User 104C) | YES | NO | NO | NO | ... |
| UE 102D (User 104C) | NO | YES | YES | YES | ... |
| UE 102E (User 104C) | YES | YES | NO | YES | ... |
| ... | ... | ... | ... | ... | ... |

FIG. 4

PRESENCE SERVER MESSAGE HANDLING

RELATED APPLICATIONS

This U.S. Patent Applications claims priority to U.S. Provisional Patent Application No. 62/734,147, entitled "PS IGNORE UNPUBLISH & FILTER SUBSCRIBE FOR UP," filed on Sep. 20, 2018, the entirety of which is incorporated herein by reference.

BACKGROUND

Presence servers can be used in many communication systems to provide presence information about whether user equipment (UE) of users are online. For example, communication applications can use presence information from a presence server to indicate to a UE of a user whether UEs of other users are online and available for a communication session.

In some examples, a UE can inform a presence server about capabilities of that UE. Such capability information about a UE can be accessible via the presence server to other UEs. For example, a presence server can provide information to other UEs about whether a particular UE supports certain communication protocols or services, without those other UEs polling the particular UE to request its capability information directly.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 depicts an example of data that can be stored in a capability database about the presence and capabilities of specific UEs.

DETAILED DESCRIPTION

Introduction

Figure 1:
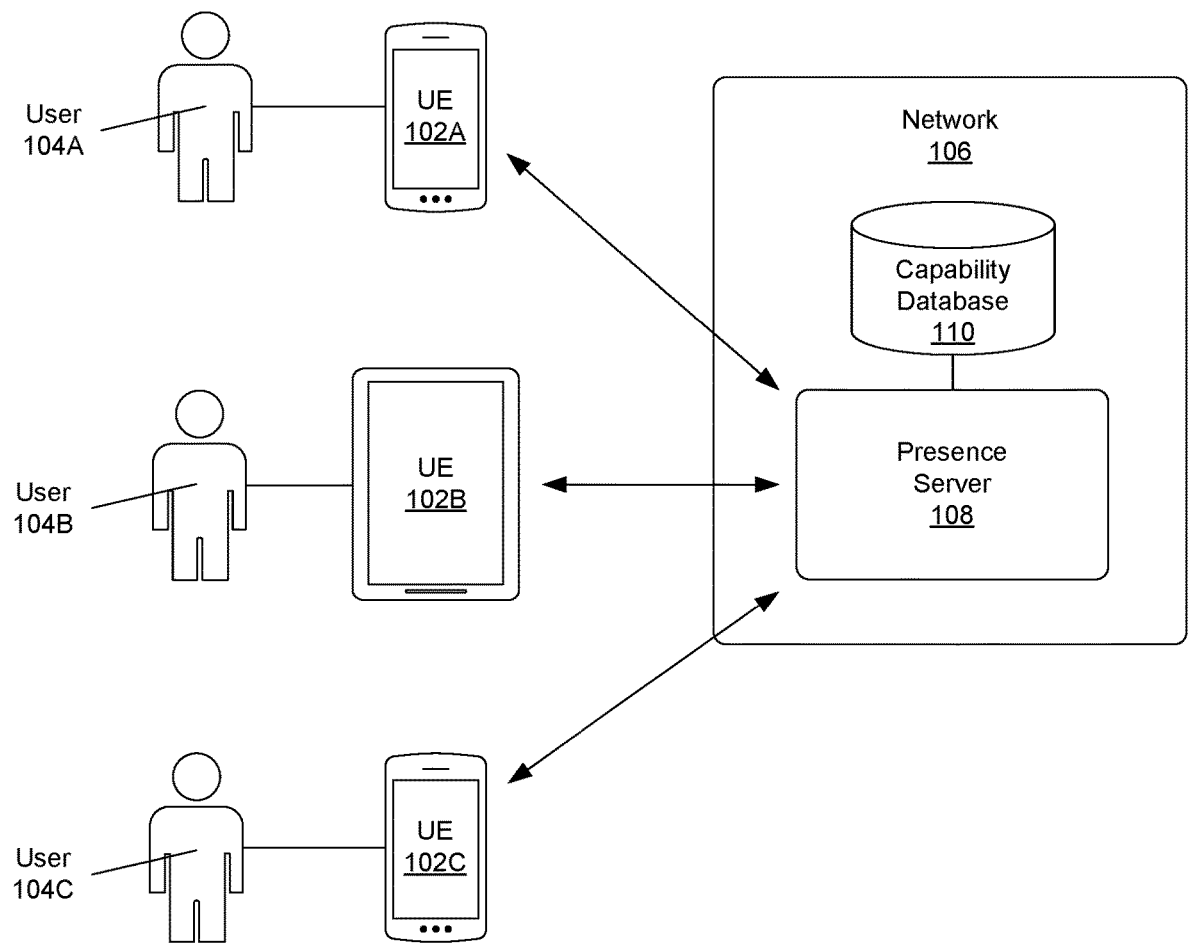
FIG. 1 depicts a first example network environment in which instances of user equipment (UE) associated with users can connect to a network.

Presence servers can be used to store and provide presence information and capability information about user equipment (UE) of users that may join communication sessions. For example, a presence server can receive presence information from a first UE indicating that the first UE is online, as well as capability information indicating that the first UE has a certain set of capabilities. The presence information and the capability information can be published at the presence server, such that other UEs can obtain the presence information and the capability information of the first UE from the presence server.

Publishing presence information and capability information about a UE at a presence server, such that the information is available to other UEs via the presence server, can be useful for many reasons. For example, other UEs can obtain presence information and capability information about a target UE from the presence server, instead of attempting to contact the target UE directly to obtain its presence information and capability information. This can reduce the number of messages that sent through a network between UEs overall, and also preserve battery life of UEs by avoiding waking up idle or sleeping UEs to respond to requests for their presence information and capability information.

In existing systems, presence information and/or capability information about a particular UE is generally only published and available to other UEs while that particular UE is online and registered with the network. When the UE powers off or otherwise deregisters from the network, the UE can be configured to send an unpublish request to the presence server requesting that its capability information be cleared so that other UEs can no longer obtain capability information about the UE from the presence server. However, clearing capability information about offline UEs can have drawbacks in many situations, especially with respect to determining if a group of UEs support compatible services when one or more of them are offline.

For example, group chat sessions between a group of UEs can exist as open group chat sessions or closed group chat sessions. Open group chat sessions can include messages sent between UEs of a modifiable group of participant users. In contrast, closed group chat sessions can include messages sent between UEs of a fixed and non-modifiable group of participant users. In some examples, open group chat sessions can be Rich Communication Services (RCS) open group chat sessions, while closed group chat sessions can use RCS closed group chat messages and/or legacy standalone messages, such as short message service (SMS) or multimedia messaging service (MMS) messages.

While UEs may support closed group chat by default, either through RCS closed group messaging or through legacy messaging, not all UEs necessarily support RCS open group chat. In some examples, systems can be configured to prevent UEs that do not support RCS open group chat from joining an RCS open group chat session. Such configurations can avoid incompatibilities due modifiable and non-modifiable groups of participant users in open group chats and closed group chats. Such configurations can also avoid network operations to interwork RCS open group chat messages with RCS closed group chat messages and/or legacy messages when UEs with different group chat capabilities are part of a group chat.

Accordingly, existing presence servers can be used to determine if all UEs of users who are, or are expected to become, party to a group chat support RCS open group chat. If all of the UEs do support RCS open group chat, then the group chat can be initiated as, or continue as, an RCS open group chat. However, if not all of the UEs support RCS open group chat, then the group chat can be initiated as a closed group chat or fall back from an open group chat to a closed group chat.

Although an existing presence server can provide useful presence and/or capability information when all of a set of UEs are online and have published their capability information to the presence server as described above, problems can arise when the presence server has removed capability information of a UE that will be a part of a group chat in response to an unpublish message. For example, if a particular UE goes offline and sends an unpublish message to the presence server, and the presence server deletes previously-stored capability information indicating that the particular UE has RCS open group chat capabilities, other UEs would then not be able to obtain that capability information about the particular UE and thus not be able to determine that the particular UE supports RCS open group chat. Although the particular UE may be offline, in many examples the offline UE can still be considered a party to a group chat because store and forward (SnF) techniques can be used to save messages for that UE for later delivery when the UE comes back online. In a situation in which a particular UE has gone offline and has unpublished its capability information, because other UEs cannot verify that the particular UE supports RCS open group chat, a group chat may be initiated as a closed group chat even though all of the UEs who will be party to the group chat do support RCS open group chat.

As another example, an RCS open group chat may have already been initiated between a group of UEs that all support RCS open group chat. However, if a particular UE in the group chat goes offline and sends an unpublish message to the presence server such that capability information indicating that the particular UE has RCS open group chat capabilities is deleted from the presence server, then the other UEs in the group chat would no longer be able to verify that the particular UE supports open group chat. In this case, when another UE sends a message to the group but cannot verify with the presence server that the other UEs all support open group chat, that UE may send the message as a closed group chat message or a standalone legacy message. This can spawn a new closed group chat session between the group of UEs, separate from the original RCS open group chat session. The original RCS open group chat session would remain in existence in addition to the new closed group chat session, such that two parallel chat sessions or threads may be open on the UEs. This can be confusing and/or frustrating for users.

In yet other examples, problems can arise in existing systems if a particular user is associated with multiple UEs that have different sets of capabilities. For example, if a user has a first UE that supports RCS open group chat and a second UE that does not support RCS open group chat, many existing presence servers would indicate that, overall, the UEs of the user collectively do support RCS open group chat. In this situation, an RCS open group chat session may begin even though one of the UEs of the user does not support RCS open group chat. The user may use the same credentials on both UEs to log into the RCS open group chat session simultaneously. Messages in the session may be delivered both to the first UE that supports RCS open group chat and to the second UE that does not support RCS open group chat. Although the network may be able to interwork the RCS open group chat messages into RCS closed group chat or legacy SMS or MMS messages when delivering messages to the second UE that does not support RCS open group chat, problems can arise if the second UE itself sends a message. For example, because the second UE does not support RCS open group chat, the second UE would send a message as an RCS closed group chat message or a legacy message. This message would thus be delivered to the first UE, and to other UEs in the group chat, as a closed group chat message in a different thread than the original RCS open group chat session. Here again, a new closed group chat session may be spawned between the group of UEs, separate from an original RCS open group chat session that may continue to remain open in parallel with the new closed group chat session. Users may then send additional messages in either parallel thread, which can be confusing and/or frustrating for users.

Described herein are systems and methods that allow a presence server to indicate whether a set of two or more UEs all support common capabilities, even if any of the UEs have attempted to unpublish their capability information and/or multiple UEs of the same user support different capabilities. These systems and methods can cause a communication session to be initiated as, or to continue as, a session type that is supported by all UEs that are, or are expected to become, part of the communication session. Accordingly, compatibility issues between UEs in a communication session can be reduced, and network processing to interwork messages between different session types can also be reduced.

Example Environment

FIG. 1 depicts an example network environment in which instances of user equipment (UE) 102 associated with users 104 can connect to a network 106 to engage in communication sessions for voice calls, video calls, messaging, chat, data transfers, and/or any other type of communication. A UE 102 can be any device that can connect to other UEs 102 via the network 106. For example, a UE 102 can be a mobile phone such as a smart phone or other cellular phone, a personal digital assistant (PDA), a personal computer (PC) such as a laptop, desktop, or workstation, a media player, a tablet, a gaming device, a smart watch, an Internet of Things (IoT) device, or any other type of computing or communication device.

In some examples, the network 106 can include multiple types of networks, including one or more access networks, one or more core networks, an IP Multimedia Subsystem (IMS), and/or other types of networks. In some examples, a UE 102 can wirelessly connect to a base station or other access point of an access network. For example, a UE 102 can connect to the network 106 via a wireless connection to an access point using one or more radio access technologies, protocols, and/or standards, such as fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology. In other examples, a UE 102 can connect to the network 106 through a wired connection, such as an Ethernet connection to an Internet-connected router, through which the UE 102 can reach an IMS and/or other network elements.

The network 106 can include a presence server 108. In some examples, the presence server 108 can be located in, or be accessible by, an IMS that is configured to set up and/or manage communication sessions between UEs 102 for voice calls, video calls, chat, messaging, and/or other types of communications. In some examples, the presence server 108 can be a Session Initiation Protocol (SIP) server, such as a SIP for Instant Messaging and Presence Leveraging Extensions (SIMPLE) server. The presence server 108 can have, or be linked to, a capability database 110. The presence server 108 can store data received from UEs 102 in the capability database 110, including presence and/or capability information about individual UEs 102, as described further below. Although FIG. 1 shows a single presence server 108 and capability database 110, in some examples the network 106 can have multiple distributed presence servers 108 that communicate with a shared capability database 110 or have separate capability databases 110 that store the same duplicated information, such that presence and/or capability information about UEs 102 can be stored by, and/or retrieved from, any of the multiple presence servers 108. Example architecture for a presence server 108 is illustrated in greater detail in FIG. 5 and is described in detail below with reference to that figure.

UEs 102 can engage in communication sessions with other UEs 102 via the network 106. In some examples, a UE 102 can be natively configured to engage in one or more types of communication sessions with other UEs 102 via the network 106. For example, an operating system for a mobile phone can have default phone and/or messaging platforms through which the mobile phone can communicate with one or more other UEs 102. In other examples, a UE 102 can execute an application that enables the UE 102 to engage in one or more types of communication sessions with other UEs 102. For example, a computer may not have a default phone or messaging platform, but the computer can execute a communication application or log into a communication application via a web browser so that the computer can engage in a communication session with one or more other UEs 102.

In some examples, communication sessions between UEs 102 can be based on services that use Rich Communication Services (RCS) protocols. RCS services can include one-to-one chat, closed group chat, open group chat, file transfer, group file transfer, large mode messaging, pager mode messaging, geolocation push, audio messaging, plug-ins, video sharing, content sharing, Internet Protocol (IP) voice calls, IP video calls, chatbots, and/or other services. As an example, RCS chat sessions can provide more advanced messaging features relative to legacy standalone messaging formats like short message service (SMS) or multimedia messaging service (MMS). For instance, RCS chat can permit one-on-one or group chats, allow the exchange of video messages, audio messages, and other files, provide read receipts, display status messages indicating that another user is currently typing a reply, and/or other advanced messaging features relative to legacy SMS messaging.

Many RCS services, including RCS chat, can be available via Universal Profile (UP) clients that can execute on UEs 102. Such UP clients can include client applications that a UE 102 can execute directly or indirectly. For example, a default messaging application on a UE 102 can be a UP client for RCS chats. As another example, a UP client can be opened through a web browser executing on a UE 102.

Different types or models of UEs 102, or different operating systems and/or client applications running on such UEs 102, may support different sets of capabilities. For example, some UEs 102 may not support RCS at all, and thus have no RCS capabilities. Some UEs 102 may have UP clients that support some RCS capabilities, but not all RCS capabilities. As will be described below, presence and/or capability information about individual UEs 102 can be used to determine if a group of UEs 102 support the same, or compatible, capabilities for a communication session.

For example, while UEs 102 may support closed group chat by default via legacy messaging and/or RCS, not all of those UEs 102 may support RCS open group chat. RCS open group chat sessions can be more flexible and/or provide different features relative to closed group chat sessions using RCS and/or legacy messaging. For example, closed group chat sessions can be associated with a fixed set of users 104, such that users 104 cannot be added or removed from a closed group chat session. In a closed group chat session between UEs 102 of a fixed set of users 104, any messages sent between UEs 102 of a different set of users 104 can spawn a new and different instance of a closed group chat session. For example, if a first closed group chat instance exists between UEs 102 of a first fixed group of three users 104, and a user 104 attempts to add a fourth user 104 to the group chat, a second closed group chat instance can be spawned between UEs 102 of a second fixed group of those four users 104, while the original first closed group chat instance remains in place between the UEs 102 of the first fixed group of three users 104. In contrast, an RCS open group chat session can be associated with a modifiable set of users 104, such that users 104 can be added or removed from the open group chat session without creating a new open group chat session. However, as noted above, some UEs 102 may not support RCS open group chat.

Accordingly, in some examples, capability information provided by the presence server 108 can be used to determine whether or not all UEs 102 in a group support RCS open group chat, and therefore whether a group chat session between those UEs 102 should be initiated as an open group chat or as a closed group chat. Similarly, in some examples, capability information provided by the presence server 108 can be used to determine whether an existing group chat should fall back from being an open group chat to being a closed group chat, if a group of UEs 102 associated with the group chat changes to include one or more UEs 102 that do not support RCS open group chat. In other examples, capability information provided by the presence server 108 can be used to determine whether UEs 102 support any other type of capability instead of, or in addition to, RCS open group chat.

Figure 2:
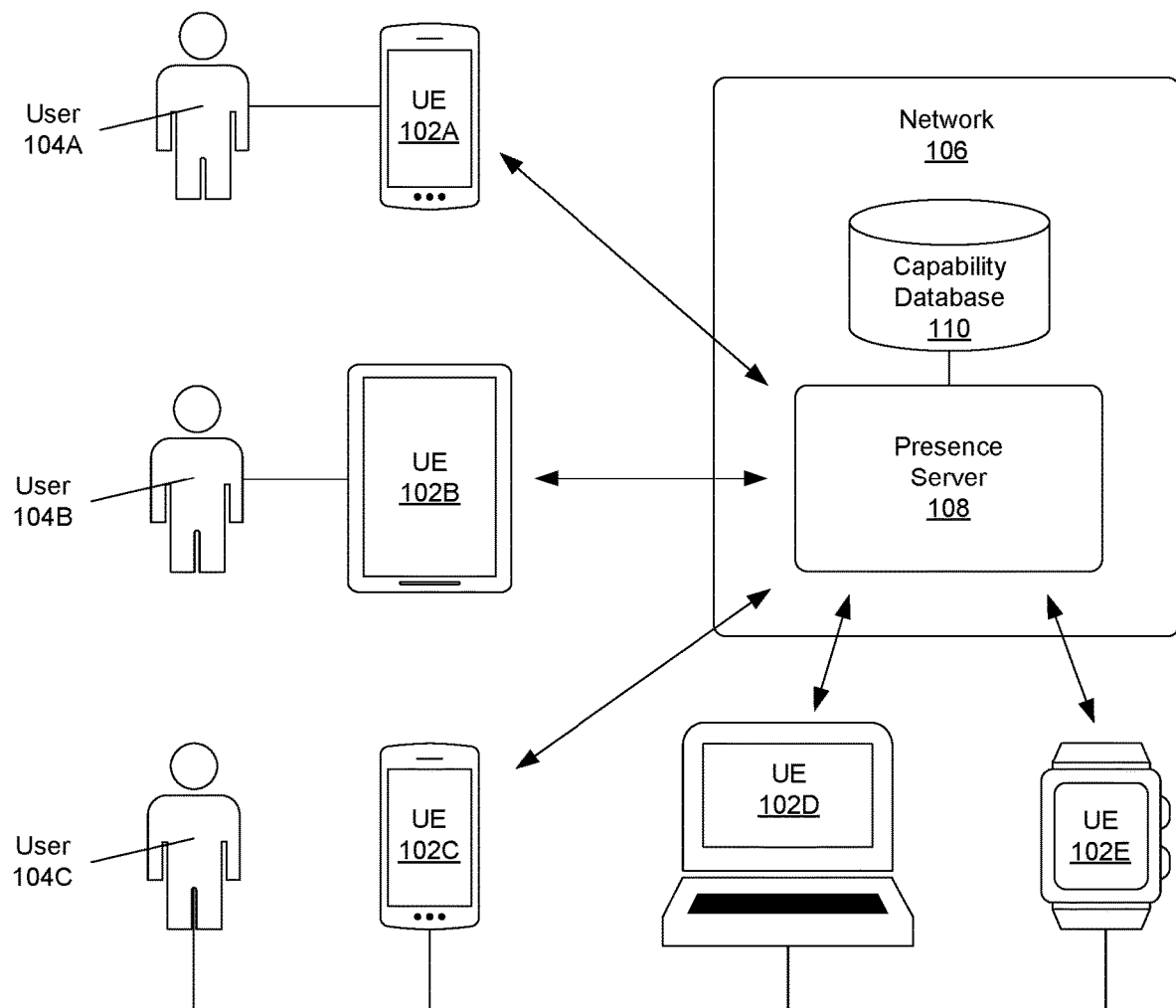
FIG. 2 depicts a second example network environment in which UEs associated with users, including multiple UEs associated with the same user, can connect to a network.

In some examples, a user 104 may be associated with more than one UE 102. For instance, although FIG. 1 shows an example in which each user 104 is associated with one UE 102, FIG. 2 depicts another example in which user 104C is associated with three UEs 102C, 102D, and 102E, including a mobile phone, a laptop computer, and a smartwatch. In the example of FIG. 2, user 104C may use one or more of UEs 102C-102E on the network 106 simultaneously using the same user account or credentials. For example, user 104C can log into the network 106 and/or client applications on one, two, or all three of UEs 102C-102E using the same telecommunication service provider account credentials, phone number, and/or SIP address.

Logging into multiple ones of UEs 102C-102E simultaneously can allow user 104C to make calls, send and receive messages, and/or engage in other types of communications using any or all of UEs 102C-102E that the user 104C has logged in to. As an example, when user 104A, user 104B, and user 104C are part of a group chat and user 104C is logged into the group chat using all three of UEs 102C-102E, user 104C may receive messages from user 104A or user 104B at chat clients on all of UEs 102C-102E. Additionally, a message sent by user 104C via a chat client on UE 102D may be sent to UE 102A of user 104A, UE 102B of user 104B, and also to UE 102C and UE 102E of user 104C.

However, although a particular user 104 may be associated with multiple UEs 102, those UEs 102 may have different sets of capabilities. As an example, in FIG. 2, UE 102C of user 104C may be a smartphone that does not support RCS at all, while UE 102D of user 104C may be a laptop executing an UP client that supports at least some RCS capabilities and UE 102E may be a smartwatch that also support at least some RCS capabilities.

Accordingly, as will be described below, capability information provided by the presence server 108 can be used to determine whether a group of UEs 102, in some examples including multiple UEs 102 associated with the same user 104, all support compatible capabilities for a communication session. As one example, UE 102A may be able to use information provided by the presence server 108 to determine whether one or more of UEs 102B-102E support RCS open group chat, even if any of those UEs 102 have deregistered from the network 106. As another example, if user 104C is logged into UE 102C, a smartphone that does not have RCS capabilities and thus does not support RCS open group chat, and user 104C is also logged into a communication client on UE 102D, a computer that does support RCS open group chat, then capability information provided by the presence server 108 can indicate that a group chat between user 104C and other users 104 should be a closed group chat because user 104C is using at least one UE 102 that does not support RCS open group chat.

Figure 3:
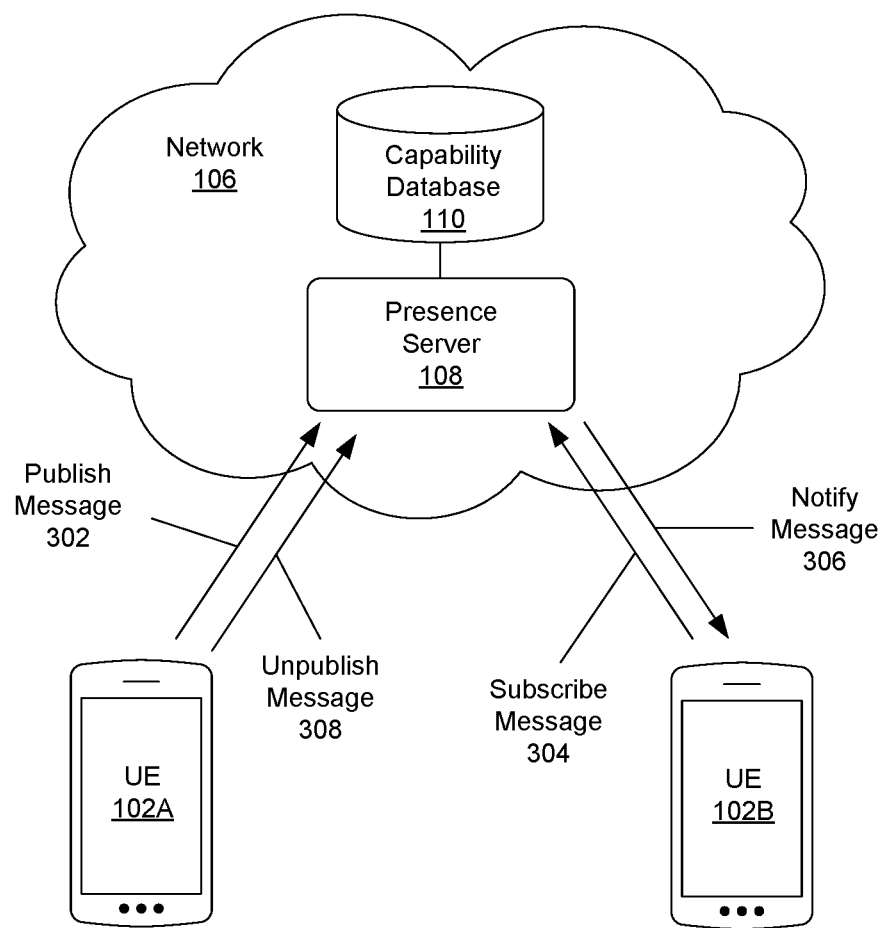
FIG. 3 depicts an example of messaging between UEs and a presence server.

FIG. 3 depicts an example of messaging between UEs 102 and a presence server 108. Messaging between UEs 102 and a presence server 108 can involve publish messages 302, subscribe messages 304, notify messages 306, and/or unpublish messages 308.

The presence server 108 can receive publish messages 302 from UEs 102. The publish messages 302 can indicate presence information about the UEs 102, such as whether the UEs 102 are online and are open to joining communication sessions with other UEs 102. The publish messages 302 can also indicate capability information about the UEs 102, such as information indicating whether the UEs 102 support various individual services or capabilities. A publish message 302 can include identifiers of the UE 102 and/or a user 104 associated with the UE 102, such as SIP address that the user 104 can use with one or more UEs 102. In some examples, a publish message 302 can be a SIP PUBLISH message.

In some examples, a UE 102 can send a publish message 302 to the presence server 108 as part of a registration process with the network 106. For example, when a UE 102 connects to the network 106, the UE 102 can register with one or more elements of the network 106, such as with an IMS element. During or after the network registration, the UE 102 can also send a publish message 302 to the presence server 108 to indicate that the UE 102 is connected to the network 106 and/or is available to engage in communication sessions. The publish message 302 can also identify one or more capabilities of the UE 102, including RCS capabilities, if any, of the UE 102 or a client application executing on the UE 102. In examples in which a user 104 is using more than one UE 102, for instance as shown in FIG. 2, each UE 102 associated with the user 104 can individually send publish messages 302 to the presence server 108 to indicate presence information and capability information of that particular UE 102.

In some examples, a publish message 302 can express data using a markup language such as Extensible Markup Language (XML). For example, a publish message 302 can include Presence Information Data Format (PIDF) information in which presence and capability information is expressed within a XML-based tags. In particular, presence and capability information for a UE 102 can be expressed in tuples of the PIDF information. One tuple in the PIDF information can be a status tuple that indicates a value expressing a presence status of the UE 102, such as open, closed, away, busy, offline, and/or other values. Other types of tuples in the PIDF information can express whether the UE 102 supports various specific capabilities.

Data in a publish message 302 sent by a UE 102 can indicate that the UE 102 supports a certain set of capabilities. Capabilities of a UE 102 identified in a publish message 302 can include a capability of the UE 102 to itself send and receive presence and/or capability information. Capabilities of a UE 102 identified in a publish message 302 can also include capabilities associated with RCS services, including one-to-one chat, closed group chat, open group chat, file transfer, group file transfer, large mode messaging, pager mode messaging, geolocation push, audio messaging, plug-ins, video sharing, content sharing, IP voice calls, IP video calls, chatbots, and/or other capabilities. For example, a UE 102 can use tuple tags in PIDF information of a publish message 302 to identify specific RCS capabilities of the UE 102, if any.

When the presence server 108 receives a publish message 302 from a UE 102, the presence server 108 can store presence and capability information of the UE 102, indicated in the publish message 302, in the capability database 110. FIG. 4 depicts an example of data that can be stored in the capability database 110 about the presence and capabilities of specific UEs 102.

For example, in response to receiving a publish message 302 from a particular UE 102, the presence server 108 can store registration status information 402 in the capability database 110 indicating that the particular UE 102 is registered with the network 106. In other examples, the presence server 108 can add or update registration status information 402 about a UE 102 in the capability database 110 in response to a third-party register (TPR) or other registration message associated with the UE 102. In other examples, the presence server 108 can instead communicate with other elements of the network 106, such as an IMS node that tracks which UEs 102 are registered with the IMS, to discover or verify registration status information 402 about UEs 102. In some examples, the registration status information 402 and/or other data in the capability database 110 can also, or alternately, track current presence information about UEs 102, such as presence status values such as open, closed, away, busy, offline, and/or other values.

The presence server 108 can also store capability information 404 in the capability database 110 indicating that the particular UE 102 has a certain set of RCS capabilities. The capability information 404 can be stored on a per-capability basis to indicate whether a UE 102 does or does not have individual ones of a set of possible capabilities, for instance based on individual tuples in PIDF information of a publish message 302. In some examples, one or more of the categories of capability information 404 tracked in the capability database 110 can be designated as a key capability 406, as discussed further below. In some examples, a key capability 406 may be a specific capability that can negatively impact user experiences when not all of the UEs 102 that are part of a communication session support the key capability 406.

Returning to FIG. 3, the presence server 108 can also receive subscribe messages 304 from UEs 102 that request presence information and/or capability information 404 about target UEs 102. In some examples, a subscribe message 304 may include an identifier associated with a particular UE 102, to request presence information and/or capability information 404 of that particular UE 102. In other examples, a subscribe message 304 may include an identifier associated with a particular user 104 that may be associated with one or more UEs 102, in order to request presence information and/or capability information 404 about any or all of the UEs 102 associated with that user 104. For example, an identifier in a subscribe message 304 can be a SIP address of a particular user 104, which may also be associated with one or more UEs 102 owned or operated by that particular user 104 as shown in FIG. 2. A UE 102 that requests presence information and/or capability information 404 about a particular UE 102, or one or more UEs 102 of a particular user 104, can be referred to as a watcher UE 102. In some examples, a subscribe message 304 can be a SIP SUBSCRIBE message.

If information about a target UE 102 requested by a watcher UE 102 in a subscribe message 304 is stored in the capability database 110, or is later stored in the capability database 110 based on a later publish message 302, the presence server 108 can send the requested presence information and/or capability information 404 to the watcher UE 102 in a notify message 306. For example, if UE 102A in FIG. 3 sends its capability information 404 to the presence server 108 in a publish message 302, and UE 102B sends a subscribe message 304 to the presence server 108 requesting the capability information 404 of UE 102A, the presence server 108 can provide the capability information 404 of UE 102A to UE 102B in a notify message 306. In some examples, a notify message 306 can be a SIP NOTIFY message.

A UE 102 can also send an unpublish message 308 to the presence server 108. A UE 102 can be configured to send an unpublish message 308 to the presence server 108 when the UE 102 powers off, or otherwise deregisters or disconnects from the network 106. The unpublish message 308 can request that presence information and capability information 404 associated with the UE 102 be cleared from the network 106. For example, the unpublish message 308 can be a specialized publish message 302 with a header value or other data that indicates that the UE 102 is attempting to clear information from the network 106 rather than publish new information to the network 106. For example, the unpublish message 308 can be a SIP PUBLISH message with an "expires" header value set to zero to indicate that presence information and/or capability information 404 of the UE 102 is expired.

However, although a UE 102 can send an unpublish message 308 to the presence server 108 as described above, in some examples the presence server 108 can at least partially disregard that unpublish message 308 and continue to store previously-stored capability information 404 about the UE 102 in the capability database 110. Accordingly, despite an attempt by a UE 102 to clear its capability information 404 from the network 106 using an unpublish message 308, the presence server 108 can continue to maintain that capability information so that the capability information 404 of the UE 102 is available to be sent to other UEs 102 in notify messages 306 in response to subscribe messages 304. As an example, even if UE 102A in FIG. 1 or FIG. 2 submits an unpublish message 308 to the presence server 108, the presence server 108 can ignore that unpublish message 308 and maintain capability information 404 of UE 102A in the capability database 110 so that the capability information 404 of UE 102A remains available from the presence server 108 to the other UEs 102 shown in FIG. 1 or FIG. 2.

In some examples, the presence server 108 may respond to an unpublish message 308 from a UE 102 by updating registration status information 402 about the UE 102 in the capability database 110 to indicate that the UE 102 is not currently registered with the network 106 and/or is not online or available to engage in communication sessions with other UEs 102. In other examples, the presence server 108 may receive a separate deregister message associated with the UE 102, and update the registration status information 402 about the UE 102 in the capability database 110 accordingly. In other examples, the presence server 108 may obtain information from another network element, such as an IMS registration node, indicating that the UE 102 is no longer registered with the network 106, and can accordingly update the registration status information 402 in the capability database 110 to indicate that the UE 102 is not currently registered with the network 106. However, although the presence server 108 can accordingly determine when a UE 102 deregisters from the network 106, the presence server 108 may nevertheless maintain previously-stored capability information 404 about that UE 102 in the capability database 110.

In some examples, the presence server 108 can be configured to continue to store previously-stored capability information 404 about a UE 102 in the capability database 110 indefinitely following receipt of an unpublish message 308 from the UE 102. In other examples, the presence server 108 can be configured to continue to store previously-stored capability information 404 about a UE 102 in the capability database 110 for at least a threshold period of time following receipt of an unpublish message 308 from the UE 102. For instance, the presence server 108 can be configured to continue to store previously-stored capability information 404 about a UE 102 in the capability database 110 for a day, a week, a month, or any other period of time, following receipt of an unpublish message 308 from the UE 102.

Keeping capability information of a UE 102 published and available to other UEs 102 at a presence server 108, despite the UE 102 going offline and/or attempting to clear its capability information 404 from the network 106, can be useful in many situations. For example, maintaining previously-published capability information 404 of a UE 102, instead of clearing it when the UE 102 goes offline and sends an unpublish message 308, can be used to ensure that a new communication session is initiated between UEs 102 of users 104 using a format or type that all of the UEs 102 associated with those users 104 support, even if one of those UEs 102 is currently offline. Maintaining previously-published capability information 404 of a UE 102, instead of deleting that capability information 404 as requested by an unpublish message 308, can also prevent changes to existing communication sessions that might otherwise occur if other UEs 102 could not obtain the capability information 404 of an offline UE 102.

For example, although RCS open group chat may have benefits compared to closed group chat via RCS and/or legacy messaging, to avoid incompatibilities and message interworking operations, chat systems may require or recommend that all UEs 102 in a group chat support RCS open group chat capabilities for the group chat to be initiated as, or to continue as, an RCS open group chat. Here, because previously-published capability information 404 about a UE 102 that is no longer registered with the network 106 can be maintained in the capability database 110, despite that UE 102 sending an unpublish message 308, other UEs 102 can still obtain and use that capability information 404 to determine if that UE 102 does or does not support RCS open group chat.

For instance, if other UEs 102 are attempting to initiate a group chat with an offline UE 102 that previously sent a publish message 302 to the presence server 108 before sending an unpublish message 308, the other UEs 102 can exchange subscribe messages 304 and notify messages 306 with the presence server 108 to obtain capability information 404 of the now-offline UE 102. If the capability information 404 indicates that the offline UE 102 does have RCS open group chat capability, and the other UEs 102 also have RCS open group chat capabilities, the group chat can be initiated as an RCS open group chat even though the offline UE 102 is not currently online. Because the offline UE 102 is compatible with RCS open group chat, the offline UE 102 will be able to send and receive messages in the RCS open group chat once the offline UE 102 comes back online. In some examples, store and forward (SnF) techniques can be used to save RCS open group chat messages for the offline UE 102 until the UE 102 comes back online. However, if the capability information 404 instead indicates that the offline UE 102 does not have RCS open group chat capability, the group chat can be initiated as a closed group chat that the offline UE 102 will be compatible with by default when it comes back online.

In other situations, an RCS open group chat may already have been initiated between a group of UEs 102 that all support RCS open group chat. If one UE 102 then goes offline and sends an unpublish message 308, due to the presence server 108 disregarding that unpublish message 308 as described herein, the other UEs 102 who are a part of the group chat can continue to obtain capability information 404 of the offline UE 102 from the presence server 108 using subscribe messages 304 and notify messages 306. For example, if one of the other UEs 102 has a cache of capability information 404 about the UEs 102 who are party to the RCS open group chat, but that cache information expires, the UE 102 can still be able to acquire capability information 404 about the now-offline UE 102 from the presence server 108. Accordingly, other UEs 102 in the group chat can continue to use capability information 404 from the presence server 108 to verify that the offline UE 102 has RCS open group chat capability, even though the offline UE 102 sent an unpublish message 308 in an attempt to clear information about its RCS capabilities from the network 106. Because the UEs 102 can continue to verify that the offline UE 102 supports open group chat, the UEs 102 can avoid falling back from the open group chat to a default closed group chat, and thus avoid spawning a new and separate closed group chat thread or instance. In some examples, although the offline UE 102 is not currently registered with the network, SnF techniques can be used to save open group chat messages for the offline UE 102 and deliver the messages once the offline UE 102 next registers with the network 106.

In other examples, disregard of an unpublish message 308 from a UE 102 by the presence server 108 can allow information about any other type of capability of the UE 102 to be obtained by other UEs 102 for any other reason. For example, when a UE 102 sends an unpublish message 308 before powering off or otherwise deregistering from the network 106, the presence server 108 can nevertheless continue to store previously-received capability information 404 of that UE 102 so that other UEs 102 can continue to obtain capability information 404 about other types of RCS services supported by the UE 102 in addition to, or besides, open group chat. For instance, other UEs 102 can still obtain capability information 404 of an offline UE 102 from the presence server 108 and use that capability information 404 to determine if the offline UE 102 supports one-to-one RCS chat, RCS file transfers, and/or other RCS services.

For example, a one-to-one RCS chat may begin between a first UE 102 and a second UE 102 that both have UP chat clients. If the second UE 102 goes offline and deregisters from the network 106, the presence server 108 can ignore an unpublish message 308 from the second UE 102 and continue to store capability information 404 in the capability database 110 that indicates that the second UE 102 has one-to-one RCS chat capabilities. Accordingly, the first UE 102 can continue to verify with the presence server 108 that the now-offline second UE 102 supports one-to-one RCS chat, for instance if cached information at the first UE 102 about capabilities of the second UE 102 expires. Accordingly, the existing one-to-one RCS chat session can be maintained, and a fallback to legacy messaging between the two UEs 102 can be prevented.

As discussed above, a presence server 108 can use notify messages 306 to provide capability information 404 about target UEs 102 to watcher UEs 102 in response to subscribe messages 304, whether the target UEs 102 are online or are offline and have sent unpublish messages 308. However, in some examples, the presence server 108 can filter and/or adjust capability information 404 of a target UE 102 provided to a watcher UE 102 in a notify message 306 to be different than the capability information 404 of the target UE 102 stored in the capability database 110. Such filtering of stored capability information for a target UE 102 in a notify message 306 can be based on capabilities of the watcher UE 102 itself, a registration status of the target UE 102, and/or set operations on different sets of capability information 404 of different UEs 102 associated with the same user 104.

In some examples, the presence server 108 can determine capability information of watcher UE 102 from a subscribe message 304. Although a subscribe message 304 from a watcher UE 102 can request presence and/or capability information about a target UE 102 as discussed above, the subscribe message 304 can also indicate, directly or indirectly, that the watcher UE 102 itself supports one or more capabilities. For example, a contact header and/or other data in a subscribe message 304 may include a name or other identifier of a client application on the watcher UE 102. The presence server 108 can accordingly use the identifier of the client application to identify capabilities associated with that client application and thus infer capabilities of the watcher UE 102. For instance, an identifier in a contact header of a subscribe message may implicitly indicate that a client application is a UP client and/or has certain RCS capabilities. In other examples, a subscribe message 304 can include, in a contact header and/or other information, data that identifies an operating system, device type, model type, application type, and/or other any other information about a watcher UE 102 from which the presence server 108 can at least indirectly determine capabilities of the watcher UE 102. In still other examples, the presence server 108 can determine capability information of watcher UE 102 from capability information 404 about the watcher UE 102 in the capability database 110 that was stored based on an earlier publish message 302 from the watcher UE 102.

In some examples, the presence server 108 can use explicitly identified capability information 404 and/or inferred capabilities of a watcher UE 102 to filter capability information 404 of a target UE 102 provided to the watcher UE 102 in a notify message 306. For example, as noted above, some UEs 102 do not support RCS open group chat. If a watcher UE 102 does not support RCS open group chat, and chat clients or services may require that all participants support RCS open group chat capabilities for a group chat to be initiated or continue as an RCS open group chat, information indicating that target UEs 102 support RCS open group chat may be irrelevant to the watcher UE 102. Accordingly, the presence server 108 can filter capability information 404 about target UEs 102 in notify messages 306 sent to the watcher UE 102 to indicate to the watcher UE 102 that the target UEs 102 also do not support RCS open group chat, even if one or more of those targets UEs 102 actually do support RCS open group chat.

In some examples, the presence server 108 can be configured to provide capability information 404 of a target UE 102 in a notify message 306 to a watcher UE 102, without filtering based on capabilities of the watcher UE 102, when the target UE 102 is currently registered with the network 106. For example, if a watcher UE 102 is not RCS-compatible, but a target UE 102 is RCS-compatible and is currently registered with the network 106, the presence server 108 may be configured to provide unfiltered capability information 404 about the target UE 102 to the watcher UE 102 in a notify message 306.

However, if the target UE 102 is not currently registered with the network 106 but the presence server 108 has continued to maintain capability information 404 about the target UE 102 in the capability database 110 despite a receiving an unpublish message 308 from that target UE 102, the presence server 108 may be configured to filter the capability information 404 of the target UE 102 in a notify message 306 sent to a watcher UE 102 based on at least some capabilities of the watcher UE 102. In some examples, the presence server 108 may be configured to filter the capability information 404 of the target UE 102 in a notify message 306 sent to a watcher UE 102 based at least on whether the watcher UE 102 is compatible with one or more designated key capabilities 406.

For example, if a target UE 102 is not currently registered with the network 106, capability information 404 of that target UE 102 may remain available via the presence server 108 as described above. The maintained capability information 404 of the target UE 102 may indicate that the target UE 102 supports certain RCS services. One or more of those RCS services may have been designated as key capabilities 406. If a watcher UE 102 indicates in a contact header of a subscribe message 304 that the watcher UE 102 has a UP client and is thus RCS-compatible, the presence server 108 can provide the target UE's capability information 404 with respect to the RCS services in a notify message 306 to the watcher UE 102. Accordingly, the watcher UE 102 may be able to initiate a communication session using RCS services that both the target UE 102 and the watcher UE 102 support.

However, if in this example the watcher UE 102 instead does not indicate in a contact header of a subscribe message 304 that the watcher UE 102 has a UP client, the presence server 108 can filter the capability information 404 about the target UE 102 to instead return default information, such as an empty list, in a notify message 306 with respect to RCS services. For example, the presence server 108 can filter the capability information 404 to indicate that the target UE 102 does not support one or more key capabilities 406 if the presence server 108 infers from the subscribe message 304 that the watcher UE 102 does not, or is not likely to, support those key capabilities 406. This may, for example, avoid a watcher UE 102 with a non-UP client discovering that an offline UE 102 supports RCS and then attempting to set up a closed group chat with the offline UE 102, thereby also avoiding network operations to interwork closed group chat messages to legacy messages.

As another example, a one-to-one messaging session may begin between a first UE 102 that does not have a UP chat client and a second UE 102 that does have a UP chat client. Here, if the second UE 102 goes offline and deregisters from the network 106, the presence server 108 can ignore an unpublish message 308 from the second UE 102 and continue to store capability information 404 in the capability database 110 that indicates that the second UE 102 has one-to-one RCS chat capabilities. The first UE 102 may accordingly be able to acquire capability information 404 about the now-offline second UE 102, for instance if cached information at the first UE 102 about capabilities of the second UE 102 expires. However, here the first UE 102 can be a watcher UE 102, and may indicate in a contact header of a subscribe message 304 that it does not have a UP chat client. The presence server 108 can accordingly filter the capability information 404 of the offline second UE 102 sent in a notify message 306 to the first UE 102 based on inferred capabilities of the first UE 102 associated with the non-UP chat client. In particular, the presence server 108 can, with respect to a one-to-one RCS chat capability category designated as a key capability 406, send blank default information for that capability category in the notify message 306 instead of data indicating that the second UE 102 supports one-to-one RCS chat capabilities. Accordingly, the first UE 102 would not discover that the second UE 102 supports one-to-one RCS chat, and would thus send subsequent messages to the second UE 102 as SMS messages or other non-RCS legacy messages.

In some examples, the presence server 108 can also filter capability information 404 about a set of UEs 102 associated with the same user 104 in a notify message 306 based on one or more set operations, such as unions and/or intersections of capability information 404 on a per-capability basis. As discussed above, when a particular user 104 is using multiple UEs 102 as shown in FIG. 2, the capability database 110 can store distinct sets of capability information 404 about each of those UEs 102. As each UE 102 may support a different set of capabilities, a set of UEs 102 associated with the same user 104 may or not have the same capabilities on a per-capability basis.

One or more specific capabilities can be designated as key capabilities 406 at the presence server 108 and/or capability database 110, as shown in FIG. 4. The presence server 108 can be configured to use an intersection operation to determine if all of the UEs 102 associated with a user 104 have a key capability 406. If all of the UEs 102 associated with a user 104 share a particular key capability 406, the presence server 108 can report in one or more notify messages 306 that the UEs 102 of the user 104 do support that particular key capability 406. However, if fewer than all of the UEs 102 associated with a user 104 have a particular key capability 406, the presence server 108 can be configured to avoid indicating in one or more notify messages 306 that any of the UEs 102 of the user 104 have that particular key capability 406.

For example, as discussed above, some UEs 102 do not support RCS open group chat, and compatibility issues can arise if a user 104 attempts to logs into a group chat using both a first UE 102 that supports RCS open group chat and a second UE 102 that does not support RCS open group chat. Here, an RCS open group chat capability can be designated at the presence server 108 as a key capability 406. In this example, an intersection operation can indicate that not all of the user's UEs 102 have the "key" RCS open group chat capability, and the presence server 108 can accordingly filter capability information 404 provided to watcher UEs 102 in notify messages 306 to avoid indicating that any of the user's UEs 102 have RCS open group chat capabilities. This can accordingly prevent initiation, or continuation, of an RCS open group chat session that all of the expected participant UEs 102 are not compatible with.

However, for non-key capabilities, the presence server 108 can be configured to use a union operation to determine if any of the UEs 102 associated with a user 104 have a non-key capability. For example, if a user 104 is logged into a group chat through multiple UEs 102, but only has file transfer capabilities, it may not matter which of the user's UEs 102 sends or receives file transfers. Accordingly, file transfer capabilities may be designated as non-key capabilities at the presence server 108, and the presence server 108 can be configured to identify in one or more notify messages 306 when at least one of the UEs 102 of the user 104 have those non-key capabilities.

Although the examples described herein use intersection operations for key capabilities 406 and union operations for non-key capabilities when filtering capability information 404 for multiple UEs 102 associated with the same user, in other examples the presence server 108 can be configured to use these or any other operations for specific categories of capability information 404 when filtering the capability information 404 for multiple UEs 102 associated with the same user. For example, the presence server 108 may be configured to use an intersection operation with respect to a first category of capability information 404, a difference operation with respect to a second category of capability information 404, and/or a union operation with respect to a third category of capability information 404.

Example Architecture

Figure 5:
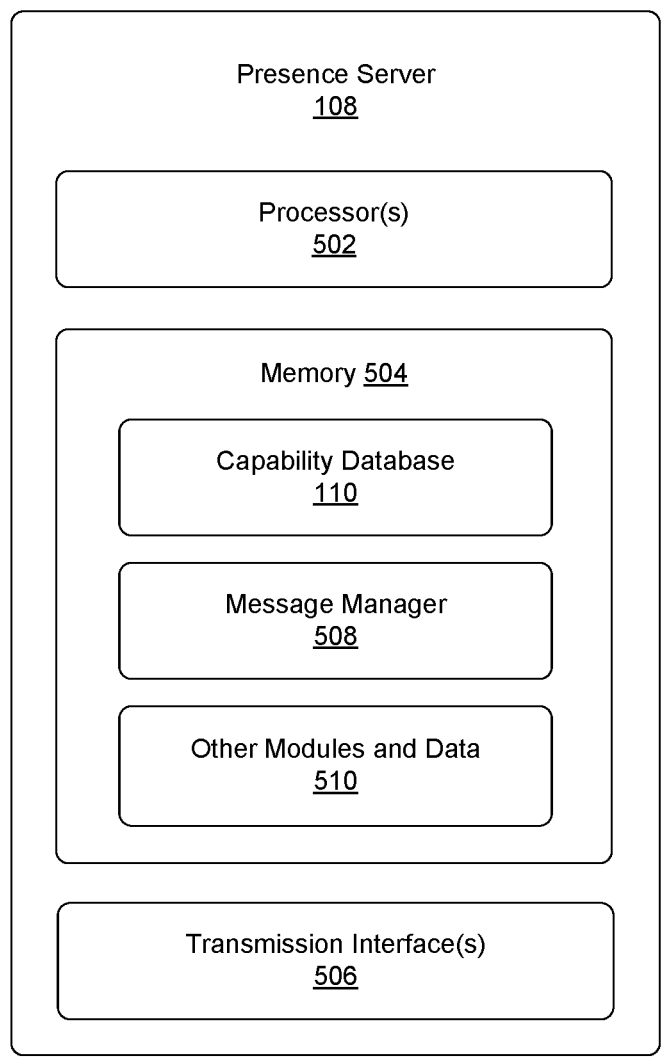
FIG. 5 depicts an example system architecture for a presence server.

FIG. 5 depicts an example system architecture for a presence server 108, in accordance with various examples. As shown, the presence server 108 can include processor(s) 502, memory 504, and transmission interfaces 506.

In various examples, the processor(s) 502 can be a central processing unit (CPU), a graphics processing unit (GPU), both CPU and GPU, or any other type of processing unit. Each of the one or more processor(s) 502 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 502 may also be responsible for executing all computer applications stored in the memory 504, which can be associated with common types of volatile (RAM) and/or nonvolatile (ROM) memory.

In various examples, memory 504 can include system memory, which may be volatile (such as RAM), non-volatile (such as ROM, flash memory, etc.) or some combination of the two. The memory 504 can also include additional data storage devices (removable and/or non-removable) such as, for example, magnetic disks, optical disks, or tape. Memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store information and which can be accessed by the presence server 108. Any such non-transitory computer-readable media may be part of the presence server 108.

In some examples, the memory 504 can store the capability database 110. In other examples, the capability database 110 can be stored at a different network element, but be accessible to the presence server 108. The memory 504 can also store computer-readable instructions and/or other data associated with a message manager 508 and/or other modules and data 510.

The message manager 508 can receive and analyze publish messages 302 and unpublish messages 308 from UEs 102 that are received by the presence server 108. The message manager 508 can add or update presence information and/or capability information 404 associated with a UE 102 in the capability database 110 based on data in a publish message 302. However, the message manager 508 can be configured to at least partially ignore an unpublish message 308 from a UE 102 such that previously-stored capability information 404 associated with the UE 102 is not removed from the capability database 110 in response to the unpublish message 308. In some examples, the message manager 508, or another element of the presence server 108, can update registration status information 402 associated with a UE 102 in response to an unpublish message 308 or registration information indicating that the UE 102 has deregistered from the network 106.

The message manager 508 can also be configured to receive subscribe messages 304 from watcher UEs and respond with notify messages 306 to provide requested presence information and/or capability information 404 about target UEs 102. When the message manager 508 has disregarded an unpublish message 308 from a UE 102 such that capability information 404 of that UE 102 is still stored in the capability database 110, the message manager 508 can accordingly still provide requested capability information 404 of that UE 102 to watcher UEs 102 in notify messages 306.

In some examples, the message manager 508 can use a contact header and/or other data in a subscribe message 304 from a watcher UE 102 to determine one or more capabilities of the watcher UE 102. The message manager 508 can also be configured to filter capability information 404 of a target UE 102 provided to a watcher UE 102 in a notify message 306 to potentially be different from the capability information 404 of that target UE 102 stored in the capability database 110. Filtering of capability information 404 by the message manager 508 can be based on capabilities of a watcher UE 102, a registration status of a target UE 102, and/or set operations on different sets of capability information 404 of different UEs 102 associated with the same user 104.

The other modules and data 510 can be utilized by the presence server 108 to perform or enable performing any action taken by the presence server 108. The modules and data 510 can include a platform, operating system, and/or applications, and data utilized by the platform, operating system, and/or applications. For examples, the other modules and data 510 can include an operating system or applications with a user interface that allows users to configure how unpublish messages 308 are processed and/or how long previously-stored capability information 404 is kept following receipt of an unpublish message, which categories of capability information 404 are key capabilities 406, which set operations are associated with which categories of capability information 404, and/or view or change any other configurable variables associated with the presence server 108.

The transmission interfaces 506 can include one or more modems, receivers, transmitters, antennas, interfaces, error correction units, symbol coders and decoders, processors, chips, application specific integrated circuits (ASICs), programmable circuit (e.g., field programmable gate arrays), software components, firmware components, and/or other components that enable the presence server 108 to communicate with other elements in the network 106, including UEs 102 and other network elements.

Example Operations

Figure 6:
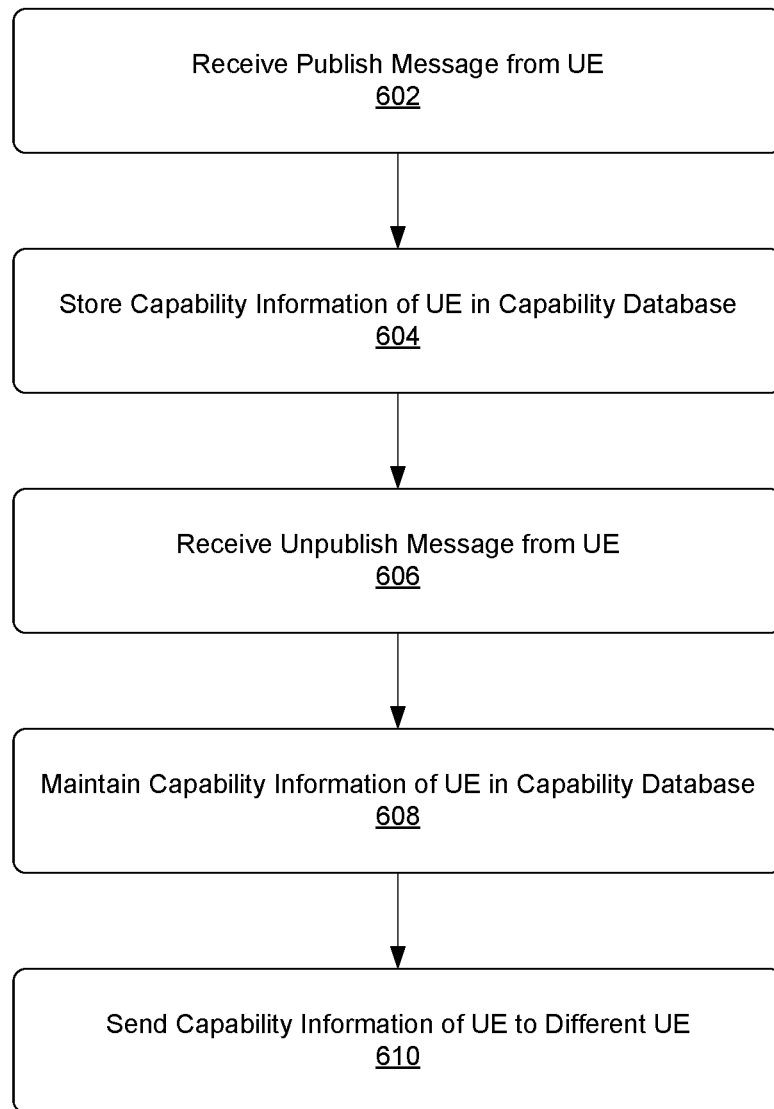
FIG. 6 depicts a flowchart of a process by which a presence server can at least partially disregard an unpublish message from a UE.

FIG. 6 depicts a flowchart of a process by which a presence server 108 can at least partially disregard an unpublish message 308 from a UE 102.

At block 602, the presence server 108 can receive a publish message 302 from a UE 102. The publish message 302 can include information identifying a set of capabilities of the UE 102 and/or one or more client applications that can execute on the UE 102. In some examples, the set of capabilities of the UE 102 and/or the client applications can be identified in tuples of PIDF information within the publish message 302. In some examples, the publish message 302 can also indicate presence information about the UE 102, such as values including open, closed, away, busy, offline, and/or other values.

At block 604, in response to receipt of the publish message 302, the presence server 108 can store capability information 404 about the UE 102 in a capability database 110. The presence server 108 can add or update capability information 404 about the UE 102 in the capability database 110 on a capability-by-capability basis based on information in the publish message 302, such that the presence server 108 tracks whether the UE 102 supports individual ones of a set of possible capabilities. The stored capability information 404 about the UE 102 can be available to other UEs 102 via the presence server 108 through exchanges of subscribe messages 304 and notify messages 306.

In some examples, the presence server 108 can also store current present information about the UE 102 as indicated in the publish message 302. The presence server 108 can also store registration status information 402 indicating that the UE 102 is currently registered with the network 106, either in response to receipt of the publish message 302 or in response to a separate registration message from the UE 102 or another network element.

At block 606, the presence server 108 can receive an unpublish message 308 from the UE 102. For example, the UE 102 can send an unpublish message 308 to the presence server 108 when the UE 102 deregisters from the network 106.

At block 608, the presence server 108 can maintain storage of the previously-stored capability information 404 about the UE 102 in the capability database 110 despite receipt of the unpublish message 308. Accordingly, the presence server 108 can at least partially disregard the unpublish message 308 from the UE 102.

In some examples, although the presence server 108 can continue to store previously-received capability information 404 about the UE 102 in the capability database 110 following receipt of an unpublish message 308, the presence server 108 may update registration status information 402 about the UE 102 in the capability database 110 to indicate that the UE 102 is no longer registered with the network 106. The presence server 108 can update the registration status information 402 about the UE 102 based on receipt of the unpublish message 308 or based on receipt of a separate deregister message from the UE 102 or another network element.

At block 610, the presence server 108 can provide capability information 404 about the UE 102 to another UE 102, even though the UE 102 is no longer registered with the network 106 and sent an unpublish message 308 to the presence server 108. For example, a second UE 102 can send a subscribe message 304 to the presence server 108 that requests capability information 404 about the now-offline UE 102, and the presence server 108 can respond to the subscribe message 304 by sending a notify message 306 to the second UE 102 that includes the requested capability information 404 about the now-offline UE 102.

Figure 7:
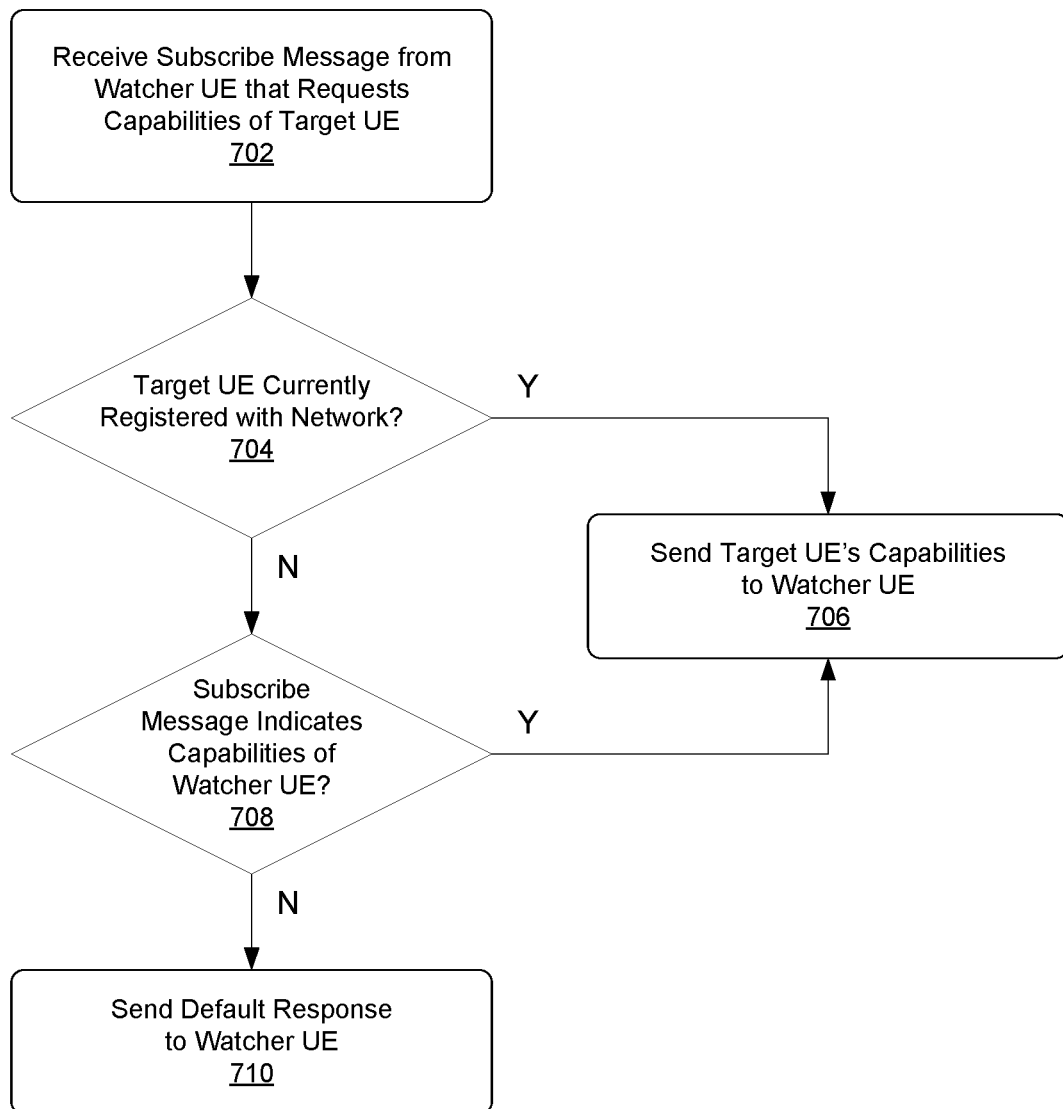
FIG. 7 depicts a flowchart of a process by which a presence server can filter capability information about a target UE provided in a notify message to a watcher UE.

FIG. 7 depicts a flowchart of a process by which a presence server 108 can filter capability information 404 about a target UE 102 provided in a notify message 306 to a watcher UE 102.

At block 702, the presence server 108 can receive a subscribe message 304 from a watcher UE 102 that requests capability information 404 about a target UE 102.

At block 704, the presence server 108 can determine if the target UE 102 is currently registered with the network 106, based on registration status information 402 of the target UE 102 stored in a capability database 110. If the registration status information 402 indicates that the target UE 102 is currently registered with the network 106, the presence server 108 can move to block 706 and send capability information 404 of the target UE 102 that is stored in the capability database 110 to the watcher UE 102 in a notify message 306.

However, if at block 704 the presence server 108 determines that the target UE 102 is not currently registered with the network 106, the presence server 108 can move to block 708. Here, if the target UE 102 has deregistered from the network 106, the target UE 102 may have sent an unpublish message 308 to the presence server 108. However, the presence server 108 can have at least partially ignored that unpublish message 308 and continued to store capability information 404 about the target UE 102 in the capability database 110.

At block 708, the presence server 108 can determine if the subscribe message 304 sent by the watcher UE 102 included information that explicitly or implicitly identifies capabilities of the watcher UE 102 itself. For example, a subscribe message 304 from a watcher UE 102 can include a contact header that identifies a client application running on the watcher UE 102, such that the presence server 108 can infer capabilities of the watcher UE 102 based on capabilities of that client application. The presence server 108 may store information about known or expected capabilities of various client applications, operating systems, models of UEs 102, and/or any other data which the presence server 108 can use to infer capabilities of a watcher UE 102 based on a contact header or other information in a subscribe message 304.

If at block 708 the presence server 108 determines that the subscribe message 304 does at least indirectly indicate one or more capabilities of the watcher UE 102, the presence server 108 can send capability information 404 about the target UE 102 to the watcher UE 102 in a notify message 306 at block 706. However, if the presence server 108 determines that the subscribe message 304 does not indicate one or more capabilities of the watcher UE 102, the presence server 108 can instead send a default response, such as an empty list, with respect to those capabilities to the watcher UE 102 in a notify message 306 at block 710.

Accordingly, although the capability information 404 of the non-registered target UE 102 stored in the capability database 110 may indicate that the target UE 102 supports certain capabilities, the presence server 108 can nevertheless filter the capability information 404 provided to the watcher UE 102 when the subscribe message 304 indicates that the watcher UE 102 itself does not support those certain capabilities. This can shield a watcher UE 102 from discovering that a non-registered target UE 102 supports capabilities with which the watcher UE 102 itself is not compatible.

In some examples, the presence server 108 may be configured to filter capability information using blocks 708 and 710 on a per-capability basis, and/or only on one or more categories of capability information 404 that have been designated at the presence server 108 as key capabilities 406. For example, capability information 404 stored in the capability database 110 about an offline target UE 102 can indicate that the offline target UE 102 has a certain key capability 406, but a subscribe message 304 from a watcher UE 102 may indicate that the watcher UE 102 does not itself have that key capability 406. In this example, the presence server 108 may at block 708 determine from a subscribe message 304 that the watcher UE 102 does not have that key capability 406, and in response filter the capability information 404 of the offline target UE 102 included in a notify message 306 at block 710 to avoid indicating that the offline target UE 102 supports that key capability 406. For instance, the presence server 108 can include an empty list as a default response in a tuple of the notify message 306 associated with that key capability 406. However, the presence server 108 may continue to provide the watcher UE 102 with unfiltered and unchanged versions of capability information 404 about the offline target UE 102 in the same notify message 306 with respect to other categories of capabilities that have not been designated as key capabilities 406.

Figure 8:
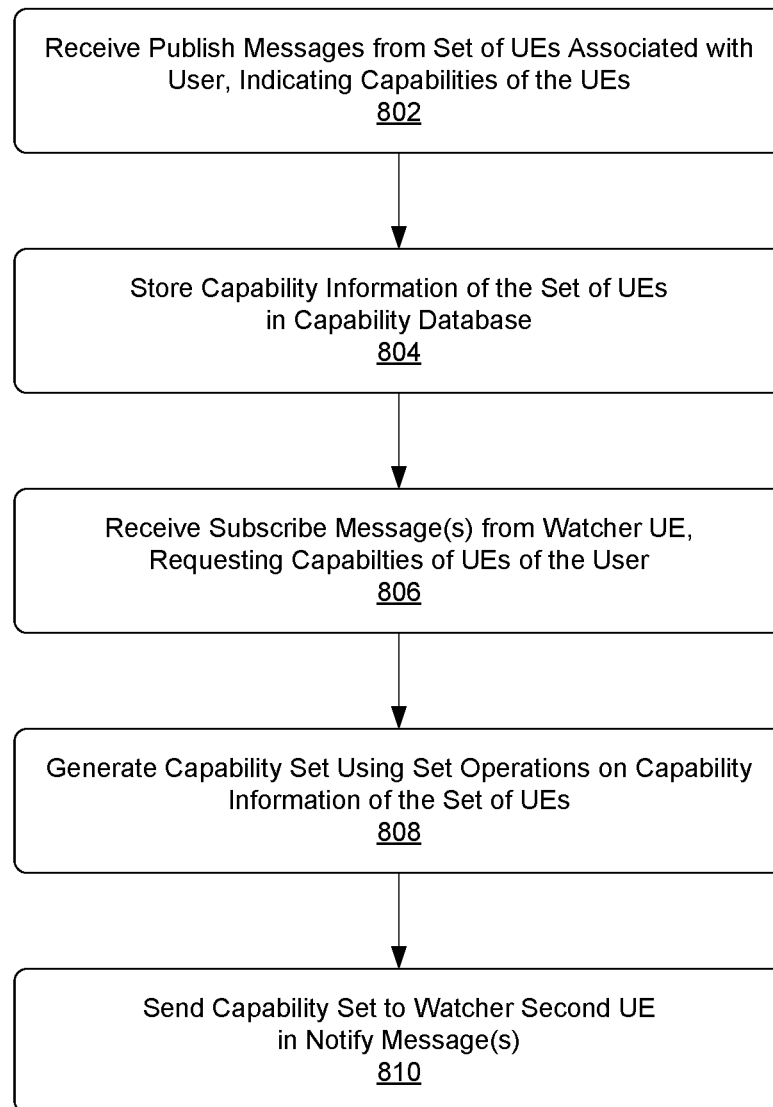
FIG. 8 depicts a flowchart of a process by which a presence server can filter capability information provided in a notify message about a set of target UEs associated with the same user.

FIG. 8 depicts a flowchart of a process by which a presence server 108 can filter capability information 404 provided in a notify message 306 about a set of target UEs 102 associated with the same user 104.

At block 802, the presence server 108 can receive publish messages 302 from a set of multiple UEs 102 associated with the same user 104. For example, the publish messages 302 can include the same user identifiers and/or account identifiers to signify that the UEs 102 are associated with the same user 104. In other examples, the presence server 108 can use registration data and/or other data from other elements in the network 106 to determine that a set of UEs 102 that have sent publish messages 302 are associated with the same user 104.

At block 804, the presence server 108 can store capability information 404 about each of the UEs 102 in a capability database 110. The presence server 108 can add or update capability information 404 about each UE 102 in the capability database 110 on a capability-by-capability basis based on information in respective publish messages 302, such that the presence server 108 tracks whether individual ones of the UEs 102 supports individual ones of a set of possible capabilities. In some examples, the presence server 108 may receive publish messages 302 and store corresponding capability information 404 for different ones of the set of UEs 102 at different times. For instance, the presence server 108 may go through blocks 802 and 804 for one UE 102 of the user 104 at one point in time, then go through blocks 802 and 804 again for another UE 102 of the user 104 at a later point in time. In some examples, the presence server 108 also may be configured to ignore later unpublish messages 308 from any of the UEs 102 of the user 104, such that the presence server 108 continues to maintain previously-stored capability information 404 about the UEs 102 in the capability database 110.

At block 806, the presence server 108 can receive one or more subscribe messages 304 from a watcher UE 102 that requests capability information 404 about UEs 102 of the user 104.

At block 808, the presence server 108 can generate a capability set associated with UEs 102 of the user 104 based on set operations on individual categories of capability information 404. For example, the presence server 108 can be configured to use an intersection operation to determine if all of the UEs 102 of the user 104 have a key capability 406. If all of the UEs 102 of the user 104 have a particular key capability 406, the presence server 108 can add that key capability 406 to the capability set. However, if less than all of the UEs 102 of the user 104 have that key capability 406, the presence server 108 can omit that key capability 406 from the capability set. As another example, the presence server 108 can be configured to use a union operation to determine if at least one of the UEs 102 of the user 104 have a capability that is not designated as a key capability 406. Here, if at least one of the UEs 102 of the user 104 have that non-key capability, the presence server 108 can add that non-key capability to the capability set. Accordingly, in this configuration, the presence server 108 can generate a capability set that identifies key capabilities 406 that all of the user's UEs 102 support, and also identifies non-key capabilities that at least one of the user's UEs 102 supports. However, in other examples, the capability set can be generated based on different set operations for different configurations of key capabilities 406 and/or non-key capabilities.

As noted above, in some examples the presence server 108 can continue to store capability information 404 in the capability database 110 about offline UEs 102 that have sent unpublish messages 308. Accordingly, in these examples, the capability set may be generated based at least in part on capability information 404 about offline UEs 102 of the user 104.

At block 810, the presence server 108 can send the capability set to the watcher UE 102 in one or more notify messages 306 in response to the one or more subscribe messages 304. Accordingly, the watcher UE 102 can discover capabilities of the set of UEs 102 associated with the same user 104 based on filtering by the presence server 108. As described above, the capability set provided to the watcher UE 102 can indicate that all of the user's UEs 102 support a certain key capability 406 or be filtered to avoid indicating to the watcher UE 102 that any of the user's UEs 102 support a certain key capability 406 when fewer than all of the user's UEs 102 support that key capability 406.

The process of FIG. 8 can prevent problems from arising when a user 104 uses multiple UEs 102 with different capabilities during a communication session, especially when one of the user's UEs 102 supports a certain key capability 406 and another one of the user's UEs 102 does not support that key capability 406. For example, the communication session can proceed in a form that does not use that key capability 406, based on the provided capability set having been filtered to avoid indicating that any of the user's UEs 102 support the key capability 406.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
receiving, by a presence server of a telecommunication network, a publish message from a user equipment (UE) indicating one or more Rich Communication Services (RCS) capabilities of the UE including an RCS open group chat capability;
storing, by the presence server, indications of the one or more RCS capabilities of the UE in a capability database;
receiving, by the presence server, an unpublish message from the UE requesting that the presence server delete the indications of the one or more RCS capabilities of the UE from the capability database;
continuing, by the presence server, to store the indications of the one or more RCS capabilities of the UE in the capability database following the receiving of the unpublish message, wherein the presence server continues to store the indications regardless of whether the UE is registered with the telecommunication network; and
providing, by the presence server, the indication that the UE has the RCS open group chat capability to a second UE while the UE is offline following the receiving of the unpublish message.

2. The method of claim 1, further comprising: receiving, by the presence server, a subscribe message from the second UE requesting the indications of the one or more RCS capabilities of the UE, wherein the presence server provides the indications of the one or more RCS capabilities of the UE to the second UE in a notify message in response to the receiving of the subscribe message.

3. The method of claim 1, wherein the unpublish message is received from the UE upon the UE deregistering from the telecommunication network, and the presence server provides the indications of the one or more RCS capabilities of the UE to the second UE while the UE is deregistered from the telecommunication network.

4. The method of claim 1, wherein the unpublish message is a second instance of the publish message with an expiration header set to zero.

5. The method of claim 1, further comprising:
storing, by the presence server, registration status information about the UE in the capability database; and
updating, by the presence server, the registration status information to indicate that the UE is not registered with the telecommunication network in response to the receiving of the unpublish message or in response to a deregister message associated with the UE.

6. A presence server of a telecommunication network, the presence server comprising:
one or more processors;
memory storing computer-executable instructions that, when executed by the one or more processors, cause the presence server to perform operations comprising:
receiving a publish message from a user equipment (UE) indicating one or more Rich Communication Services (RCS) capabilities of the UE including an RCS open group chat capability;
storing indications of the one or more RCS capabilities of the UE in a capability database;
receiving an unpublish message from the UE requesting that the presence server delete the indications of the one or more RCS capabilities of the UE from the capability database;
continuing to store the indications of the one or more RCS capabilities of the UE in the capability database following the receiving of the unpublish message, wherein the presence server continues to store the indications regardless of whether the UE is registered with the telecommunication network; and
providing the indication that the UE has the RCS open group chat capability to a second UE while the UE is offline following the receiving of the unpublish message.

7. The presence server of claim 6, wherein the operations further comprise: receiving a subscribe message from the second UE requesting the indications of the one or more RCS capabilities of the UE, wherein the presence server provides the indications of the one or more RCS capabilities of the UE to the second UE in a notify message in response to the receiving of the subscribe message.

8. The presence server of claim 6, wherein the unpublish message is received from the UE upon the UE deregistering from the telecommunication network, and the presence server provides the indications of the one or more RCS capabilities of the UE to the second UE while the UE is deregistered from the telecommunication network.

9. The presence server of claim 6, wherein the operations further comprise:
storing registration status information about the UE in the capability database; and
updating the registration status information to indicate that the UE is not registered with the telecommunication network in response to the receiving of the unpublish message or in response to a deregister message associated with the UE.

10. One or more non-transitory computer-readable media storing computer-executable instructions that, when executed by one or more processors of a presence server of a telecommunication network, cause the presence server to perform operations comprising:
receiving a publish message from a user equipment (UE) indicating one or more Rich Communication Services (RCS) capabilities of the UE including an RCS open group chat capability;
storing indications of the one or more RCS capabilities of the UE in a capability database;
receiving an unpublish message from the UE requesting that the presence server delete the indications of the one or more RCS capabilities of the UE from the capability database;
continuing to store the indications of the one or more RCS capabilities of the UE in the capability database following the receiving of the unpublish message, wherein the presence server continues to store the indications regardless of whether the UE is registered with the telecommunication network; and providing the indication that the UE has the RCS open group chat capability to a second UE while the UE is offline following the receiving of the unpublish message.

11. The one or more non-transitory computer-readable media of claim 10, wherein the operations further comprise: receiving a subscribe message from the second UE requesting the indications of the one or more RCS capabilities of the UE, wherein the presence server provides the indications of the one or more RCS capabilities of the UE to the second UE in a notify message in response to the receiving of the subscribe message.

12. The one or more non-transitory computer-readable media of claim 10, wherein the unpublish message is received from the UE upon the UE deregistering from the telecommunication network, and the presence server provides the indications of the one or more RCS capabilities of the UE to the second UE while the UE is deregistered from the telecommunication network.

13. The one or more non-transitory computer-readable media of claim 10, wherein the operations further comprise:
storing registration status information about the UE in the capability database; and
updating the registration status information to indicate that the UE is not registered with the telecommunication network in response to the receiving of the unpublish message or in response to a deregister message associated with the UE.

* * * * *